United States Patent
Terushita et al.

(10) Patent No.: US 8,550,016 B2
(45) Date of Patent: Oct. 8, 2013

(54) METHOD AND APPARATUS OF CONTROLLING FLOW RATE OF PRIMARY RECIRCULATING EXHAUST GAS IN OXYFUEL COMBUSTION BOILER

(75) Inventors: Shuuhei Terushita, Tokyo (JP); Toshihiko Yamada, Tokyo (JP); Shuzo Watanabe, Tokyo (JP); Terutoshi Uchida, Tokyo (JP)

(73) Assignees: IHI Corporation, Tokyo (JP); Electric Power Development Co., Ltd., Tokyo (JP)

( * ) Notice: Subject to any disclaimer, the term of this patent is extended or adjusted under 35 U.S.C. 154(b) by 364 days.

(21) Appl. No.: 12/920,542

(22) PCT Filed: Mar. 6, 2008

(86) PCT No.: PCT/JP2008/000472
§ 371 (c)(1),
(2), (4) Date: Dec. 17, 2010

(87) PCT Pub. No.: WO2009/110034
PCT Pub. Date: Sep. 11, 2009

(65) Prior Publication Data
US 2011/0126742 A1  Jun. 2, 2011

(51) Int. Cl.
*F23N 5/18* (2006.01)
(52) U.S. Cl.
USPC .......... 110/188; 110/204; 110/341; 73/23.31; 73/23.32; 73/23.33
(58) Field of Classification Search
USPC .............. 110/188, 204, 341; 73/23.31, 23.32, 73/23.33
See application file for complete search history.

(56) References Cited

U.S. PATENT DOCUMENTS

| | | | |
|---|---|---|---|
| 3,043,525 A | | 7/1962 | Gilbert |
| 4,411,204 A | * | 10/1983 | Hamilton ...................... 110/347 |
| 6,935,251 B2 | | 8/2005 | Marin et al. |
| 2008/0160464 A1 | * | 7/2008 | Ghani et al. ...................... 431/9 |
| 2009/0031933 A1 | | 2/2009 | Ookawa et al. |
| 2009/0183660 A1 | * | 7/2009 | Wessel .......................... 110/188 |
| 2009/0272300 A1 | | 11/2009 | Yamada et al. |

FOREIGN PATENT DOCUMENTS

| JP | 60-23717 | 2/1985 |
|---|---|---|
| JP | 60 53714 | 3/1985 |
| JP | 60 71842 | 5/1985 |
| JP | 4-244504 A | 9/1992 |
| JP | 5-26409 A | 2/1993 |
| JP | 5-168853 A | 7/1993 |

(Continued)

OTHER PUBLICATIONS

Extended European Search Report issued Apr. 12, 2012, in European Patent Application No. 08720358.4.

*Primary Examiner* — Kenneth Rinehart
*Assistant Examiner* — Bao D Nguyen
(74) *Attorney, Agent, or Firm* — Oblon, Spivak, McClelland, Maier & Neustadt, L.L.P.

(57) ABSTRACT

Provided are a method and an apparatus of controlling a flow rate of a primary recirculating exhaust gas in an oxyfuel combustion boiler, capable of realizing a stable combustion by a burner in oxyfuel combustion. Weight ratio of flow rate of primary recirculating exhaust gas [ton/h] to amount of pulverized coal from a mill [ton/h] is defined as G/C, and the flow rate of primary recirculating exhaust gas is controlled so that the G/C falls within a given range.

2 Claims, 3 Drawing Sheets

(56) References Cited

FOREIGN PATENT DOCUMENTS

| | | |
|---|---|---|
| JP | 5-172305 A | 7/1993 |
| JP | 5-231609 A | 9/1993 |
| JP | 7-318016 A | 12/1995 |
| JP | 2001-235103 A | 8/2001 |
| JP | 2001-336736 A | 12/2001 |
| JP | 2007 147162 | 6/2007 |
| WO | WO 2007/061106 A1 | 5/2007 |
| WO | WO 2007/061107 A1 | 5/2007 |

\* cited by examiner

PULVERIZED COAL AMOUNT IN MILL

PULVERIZED COAL AMOUNT IN MILL

METHOD AND APPARATUS OF CONTROLLING FLOW RATE OF PRIMARY RECIRCULATING EXHAUST GAS IN OXYFUEL COMBUSTION BOILER

TECHNICAL FIELD

The present invention relates to a method and an apparatus of controlling a flow rate of a primary recirculating exhaust gas in an oxyfuel combustion boiler.

BACKGROUND ART

An increased carbon dioxide ($CO_2$) density in the atmosphere has proved to be one of major factors of global warming which has recently come into attention as a global-scale environmental problem. A thermal power plant appears close-up as a fixed source of exhausting these substances. Fuel for the thermal power generation may be oil, natural gas and coal, among which coal is especially anticipated to have a large future demand due to its greater potential reserves.

Coal contains a higher percentage of carbon as compared with natural gas and oil, together with other components such as hydrogen, nitrogen and sulfur and ash as an inorganic component. Therefore, when coal is burned by using the air, most of the composition of the combustion exhaust gas is occupied by nitrogen (about 70%), with the remainder occupied by carbon dioxide $CO_2$, sulfur oxide $SO_X$, nitrogen oxide $NO_X$, dust comprising ashes and unburned coal particles and oxygen (about 4%). The combustion exhaust gas is thus subjected to exhaust gas treatments such as denitration, desulfurization and dedusting so that $NO_X$, $SO_X$ and particulates fall under their respective environmental emission standard values before the emission to the atmosphere through a stack.

$NO_X$ occurring in the combustion exhaust gas divides into a thermal $NO_X$ generated from oxidization of nitrogen in the air by oxygen and a fuel $NO_X$ generated as a result of oxidization of nitrogen in the fuel. Up until now, a combustion method of lowering the flame temperature has been employed for the reduction of the thermal $NO_X$, whereas another combustion method of forming a fuel-excess region deoxidizing $NO_X$ within a burner has been employed for the reduction of the fuel $NO_X$.

In case of using a fuel such as coal containing sulfur, a wet or a dry desulfurizing device has been provided to remove $SO_X$ occurring in the combustion exhaust gas as a result of the combustion.

It is desired on the other hand that a large amount of carbon dioxide generated in the combustion exhaust gas be also separated and removed with high efficiency. A possible method of capturing carbon dioxide contained in the combustion exhaust gas has hitherto been reviewed which includes a method of causing an amine or other absorbing liquid to absorb it, an adsorption method of causing a solid adsorbent to adsorb it or a film separation method, all of which have a low conversion efficiency, thus not yet reaching a practical use level of the $CO_2$ capture from a coal burning boiler.

Accordingly, a technique of burning a fuel with oxygen instead of air has been proposed as an effective technique to address at one time both the problem of the separation of carbon dioxide in the combustion exhaust gas and the problem of the suppression of the thermal $NO_X$ (see, e.g., Patent Literature 1).

When coal is burned with oxygen, generation of the thermal $NO_X$ is not seen and most of the combustion exhaust gas is occupied by carbon dioxide with the remainder occupied by other gases containing the fuel $NO_X$ and $SO_X$, consequently achieving a relatively easy liquefaction and separation of the carbon dioxide through cooling of the combustion exhaust gas.

[Patent Literature 1] JP 5-231609A

SUMMARY OF INVENTION

Technical Problems

To realize a stable combustion by a burner, an existing air-combustion coal burning boiler employs an A/C operational range of 1.5 to 4.0 as shown in FIG. 4, where A/C represents a weight ratio of the flow rate [ton/h] of a primary air which is a carrier air for pulverized coal produced by a mill to the amount [ton/h] of the pulverized coal from the mill. The operational range is determined in consideration of the facts that a flame may possibly blow out if the A/C exceeds 4.0 and that the stable combustion cannot be kept from the structure of the mill-burner system if it is below 1.5.

In case of an oxyfuel combustion coal burning boiler as disclosed in Patent Literature 1, however, the primary air is not taken in due to a difference in the combustion system from the conventional air combustion, so that the A/C cannot remain intact as an indicator for the stable combustion by the burner, dissimilar to the existing air-combustion coal burning boiler. It has been thus desired to realize a stable combustion by the burner using quite a new indicator different from the A/C.

The invention was made in view of the above and has its object to provide a method and an apparatus of controlling a flow rate of a primary recirculating exhaust gas in an oxyfuel combustion boiler, capable of realizing a stable combustion by a burner in the oxyfuel combustion.

Solution to Problems

The invention is directed to a method of controlling a flow rate of a primary recirculating exhaust gas in an oxyfuel combustion boiler wherein while oxygen fed from an oxygen producer is being introduced into a coal burning boiler, a part of an exhaust gas in recirculation is introduced as the primary recirculating exhaust gas into a mill, with the primary recirculating exhaust gas carrying pulverized coal pulverized by the mill to a burner for oxyfuel combustion, the method comprising defining G/C to be a weight ratio of the flow rate of the primary recirculating exhaust gas to amount of the pulverized coal fed from the mill; and controlling the flow rate of the primary recirculating exhaust gas so that the G/C falls within a predetermined range.

In the method of controlling the flow rate of the primary recirculating exhaust gas in the oxyfuel combustion boiler, the G/C preferably ranges from 2.0 to 6.0.

The invention is also directed to an apparatus of controlling a flow rate of a primary recirculating exhaust gas in an oxyfuel combustion boiler wherein while oxygen fed from an oxygen producer is being introduced into a coal burning boiler, a part of an exhaust gas in recirculation is introduced as the primary recirculating exhaust gas into a mill, with the primary recirculating exhaust gas carrying pulverized coal pulverized by the mill to a burner for oxyfuel combustion, the apparatus comprising:

a $CO_2$ density monitor for sensing $CO_2$ density of the primary recirculating exhaust gas to be led to the mill;

an $O_2$ density monitor for sensing $O_2$ density of the primary recirculating exhaust gas to be led to the mill;

a flowmeter for sensing the flow rate of the primary recirculating exhaust gas to be led to the mill;

a flow regulator for regulating the flow rate of the primary recirculating exhaust gas to be led to the mill;

a coal-feed-amount meter for sensing coal feed amount to be fed to the mill; and a controller for calculating specific gravity of the primary recirculating exhaust gas on the basis of the $CO_2$ and $O_2$ densities sensed by the $CO_2$ and $O_2$ density monitors, respectively, calculating weight flow rate of the primary recirculating exhaust gas on the basis of the specific gravity of the primary recirculating exhaust gas and the flow rate sensed by the flowmeter, calculating amount by weight of the pulverized coal fed from the mill on the basis of the coal feed amount sensed by the coal-feed-amount meter, defining G/C to be weight ratio of the flow rate of the primary recirculating exhaust gas to the amount of the pulverized coal from the mill, and outputting a flow control signal to the flow regulator so that the G/C lies within a predetermined range.

In the apparatus for controlling flow rate of a primary recirculating exhaust gas in an oxyfuel combustion boiler, the G/C preferably ranges from 2.0 to 6.0.

Advantageous Effects of Invention

According to a method and an apparatus of controlling a flow rate of a primary recirculating exhaust gas in an oxyfuel combustion boiler of the invention, there can be obtained an excellent effect of achieving a stable combustion by a burner in the oxyfuel combustion using quite a new indicator G/C different from the conventional A/C.

Figure 1:
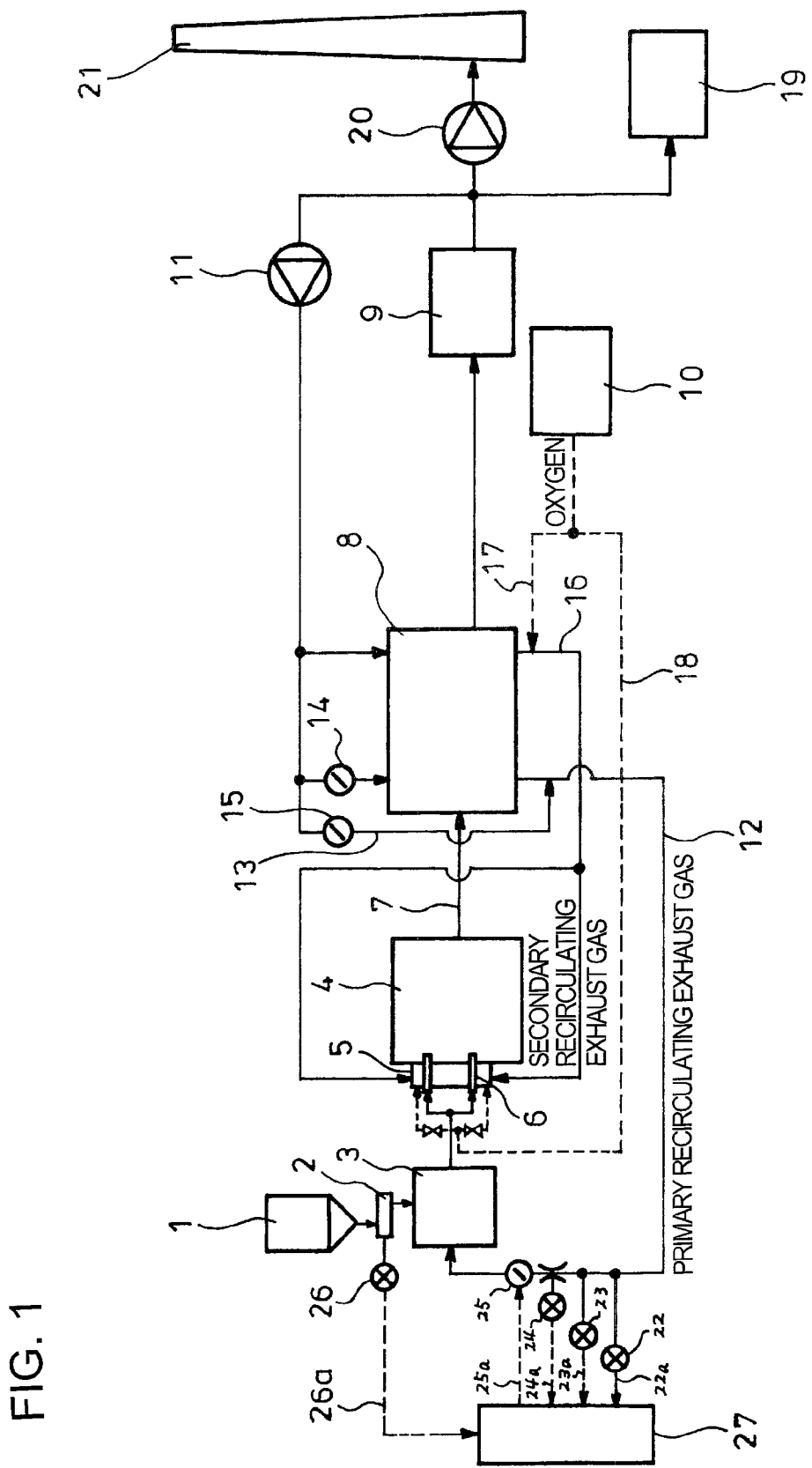
FIG. 1 is a general schematic configuration diagram of an embodiment of the invention.

REFERENCE SIGNS LIST 1 coal bunker
2 coal feeder
3 mill
4 coal burning boiler
5 window box
6 burner
7 exhaust gas line
8 air preheater
10 oxygen producer
11 forced draft fan
12 primary recirculating exhaust gas line
13 cold bypass line
16 secondary recirculating exhaust gas line
17 oxygen feed line for secondary recirculating exhaust gas
18 oxygen feed line for window box
20 induced draft fan
22 $CO_2$ density monitor
22a $CO_2$ density
23 $O_2$ density monitor
23a $O_2$ density
24 flowmeter
24a flow rate
25 flow regulating damper (flow regulator)
25a opening degree control signal (flow control signal)
26 coal-feed-amount meter
26a coal feed amount
27 controller

DESCRIPTION OF EMBODIMENT

An embodiment of the invention will be described with reference to the accompanying drawings.

Figure 2:
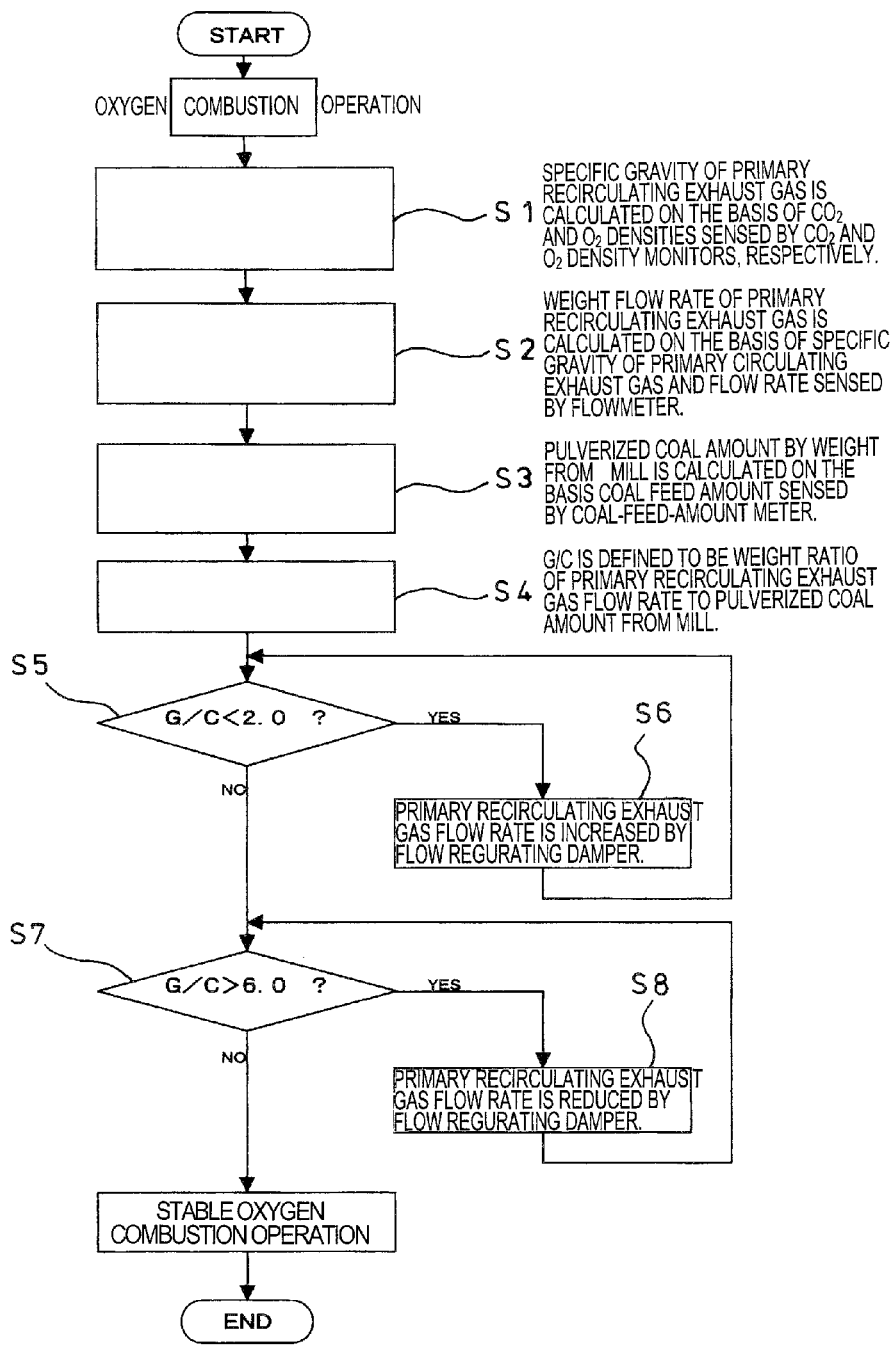
FIG. 2 is a flowchart of a flow of the control in the embodiment of the invention.
Figure 3:
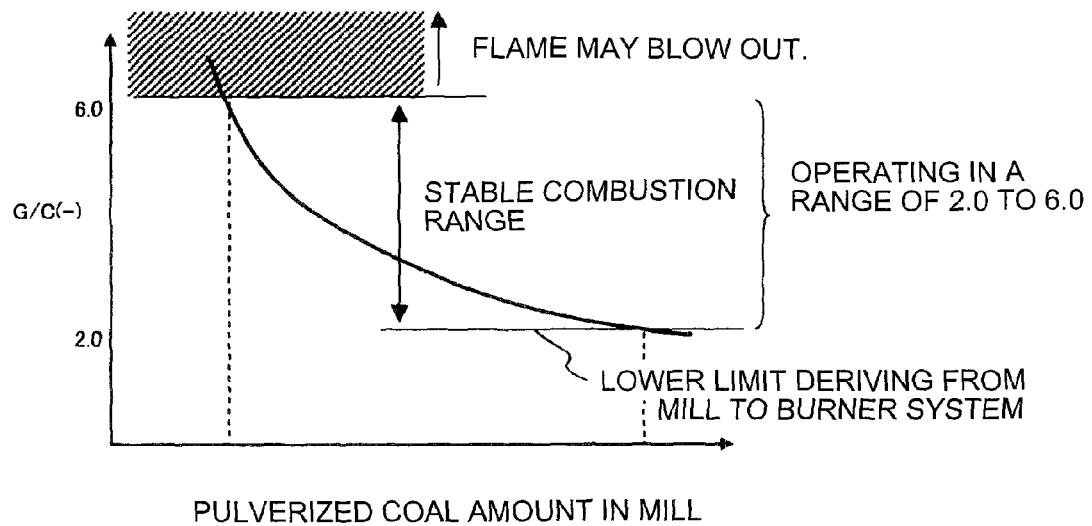
FIG. 3 is a graph of a G/C operational range in the embodiment of the invention.

Referring to FIGS. 1 to 3 showing the embodiment of the invention, reference numeral 1 denotes a coal bunker for coal storage; 2, a coal feeder feeding coal stored in the coal bunker 1; 3, a mill pulverizing and drying coal from the coal feeder 2; 4, a coal burning boiler; 5, a window box fitted to the coal burning boiler 4; 6, a burner disposed in the window box 5 for burning pulverized coal fed from the mill 3; 7, an exhaust gas line through which flows an exhaust gas emitted from the coal burning boiler 4; 8, an air preheater for the heat exchange of the exhaust gas flowing through an exhaust gas line 7 with a primary recirculating exhaust gas and with a secondary recirculating exhaust gas; 9, an exhaust gas treating device such as a desulfurizer and a dust collector for the treatment of the exhaust gas passing through the air preheater 8; 10, an oxygen producer for oxygen production; 11, a forced draft fan (FDF) forcedly sending an exhaust gas purified by an exhaust gas treating device 9 as a primary recirculating exhaust gas and a secondary recirculating exhaust gas; 12, a primary recirculating exhaust gas line leading a part of the exhaust gas forcedly sent by the forced draft fan 11 as the primary recirculating exhaust gas through the air preheater 8 for preheating to the mill 3; 13, a cold bypass line allowing a part of the primary recirculating exhaust gas led to the mill 3 to bypass the air preheater 8 to thereby control the temperature of the primary recirculating exhaust gas; 14, a flow regulating damper incorporated in the primary recirculating exhaust gas line 12 for regulating the flow rate of the primary recirculating exhaust gas passing through the air preheater 8; 15, a flow regulating damper incorporated in the cold bypass line 13 for regulating the flow rate of the primary recirculating exhaust gas bypassing the air preheater 8; 16, a secondary recirculating exhaust gas line leading a part of the exhaust gas forcedly sent by the forced draft fan 11 as the secondary recirculating exhaust gas through the air preheater 8 for preheating to the window box 5; 17, an oxygen feed line for the secondary recirculating exhaust gas which feeds the secondary recirculating exhaust gas line 16 with oxygen from the oxygen producer 10; 18, an oxygen feed line for the window box which directly feeds the window box 5 with oxygen from the oxygen producer 10; 19 denotes a capture device for capturing $CO_2$ etc. from the exhaust gas; 20, an induced draft fan (IDF) disposed downstream of the exhaust gas treating device 9 for inducedly sucking down the exhaust gas; and 21, a stack for emitting to the atmosphere the exhaust gas purified by the exhaust gas treating device 9 to be induced by the induced draft fan 20.

Further incorporated in the primary exhaust gas line 12 on the inlet side of the mill 3 are a $CO_2$ density monitor 22 for sensing a $CO_2$ density 22a of the primary recirculating exhaust gas to be led to the mill 3; an $O_2$ density monitor 23 for sensing an $O_2$ density 23a of the primary recirculating exhaust gas to be led to the mill 3; a flowmeter 24 for sensing a flow rate 24a of the primary recirculating exhaust gas to be led to the mill 3; and a flow regulating damper 25 acting as a flow regulator for regulating the flow rate 24a of the primary recirculating exhaust gas to be led to the mill 3. A coal-feed-amount meter 26 is fitted to the coal feeder 2 for sensing a coal feed amount 26a to be fed to the mill 3.

Still further provided is a controller 27 which calculates a specific gravity of the primary recirculating exhaust gas on the basis of the $CO_2$ and $O_2$ densities 22a and 23a sensed by the $CO_2$ and $O_2$ density monitors 22 and 23, respectively; which calculates out a weight flow rate of the primary recirculating exhaust gas on the basis of the specific gravity of the primary recirculating exhaust gas and the flow rate 24a sensed by the flowmeter 24; which calculates an amount by weight of the pulverized coal fed from the mill 3 on the basis of the coal feed amount 26a sensed by the coal-feed-amount meter 26; which defines as G/C a weight ratio of the flow rate [ton/h] of the primary recirculating exhaust gas fed to the coal burning boiler 4 to the amount [ton/h] of the pulverized coal from the mill 3; and which outputs an opening degree control signal 25a as a flow control signal to the flow regulating damper 25 so that the G/C lies within a predetermined range. In place of the flow regulating damper 25, a damper for example or any other flow regulators may be used such that the flow adjusting device is supplied with a flow control signal from the controller 27.

Figure 4:
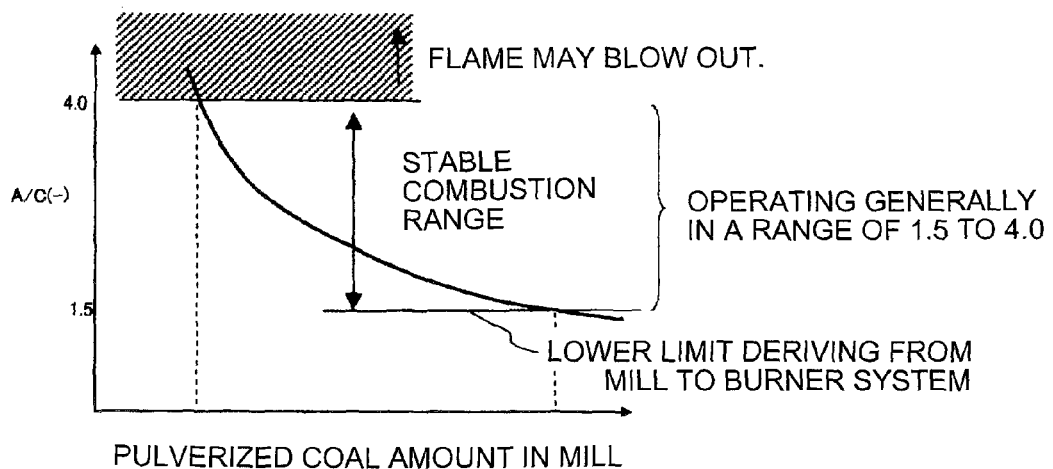
FIG. 4 is a graph of the G/C operational range in a prior art example.

To achieve the stable combustion by the burner 6, it is preferred that the G/C range be 2.0 to 6.0 as shown in FIG. 3. This results from the consideration of a difference in the specific gravity between the air and the primary recirculating exhaust gas since the conventional A/C operational range lies within the range of 1.5 to 4.0 as shown in FIG. 4. An actually performed combustion testing has proved that there arises a possibility that a flame may blow out if the G/C is greater than 6.0; that the stable combustion cannot be kept from the structure of the mill 3 to burner 6 system if it is less than 2.0; and that the stable combustion by the burner 6 becomes enabled within the range of 2.0 to 6.0.

Next, operation of the above illustrated embodiment will be described.

In the normal operation of the coal burning boiler 4 as set forth hereinabove, coal stored in the coal bunker 1 is fed by the coal feeder 2 to the mill 3 where coal is pulverized into pulverized coal while simultaneously the primary recirculating exhaust gas is introduced from the primary recirculating exhaust gas line 12 into the mill 3 to dry the coal fed thereto, the resultant dried pulverized coal being transferred to the burner 6. At that time, a part of the exhaust gas forcedly sent by the forced draft fan 11 is led as the secondary recirculating exhaust gas from the secondary recirculating exhaust gas line 16 into the window box 5 of the coal burning boiler 4 after being preheated by the air preheater 8, with oxygen produced by the oxygen producer 10 being directly fed from the oxygen feed line 18 for window box to the window box 5 to thereby subject the pulverized coal to oxyfuel combustion within the coal burning boiler 4.

At the start-up of the coal burning boiler 4, air (not shown) in lieu of the primary recirculating exhaust gas is introduced into the mill 3 so that the air dries coal fed to the mill 3 and transfers pulverized coal pulverized therein to the burner 6. On the other hand, air (not shown) instead of the secondary recirculating exhaust gas and oxygen is fed to the window box 5 of the coal burning boiler 4 so that the pulverized coal undergoes air combustion within the coal burning boiler 4. When the heat absorption of the coal burning boiler 4 reaches a predetermined value, the air is switched to the primary recirculating exhaust gas, the secondary recirculating exhaust gas and oxygen for shifting to oxyfuel combustion.

An exhaust gas emitted from the coal burning boiler 4 is introduced through the exhaust gas line 7 into the air preheater 8 where the primary recirculating exhaust gas and the secondary recirculating exhaust gas are heated and subjected to heat recovery. The exhaust gas passing through the air preheater 8 goes to the exhaust gas treating device 9 such as the desulfurizer and the dust collector for desulfurization and dust collection, with the result that the exhaust gas purified by the exhaust gas treating device 9 is induceedly sucked by the induced draft fan 20 before the emission through the stack 21 to the atmosphere. At the same time, a part of the exhaust gas passing through the exhaust gas treating device 9 is recirculated by the forced draft fan 11 and introduced into the capture device 19 for the capture of $CO_2$, etc. from the exhaust gas.

In the normal operation of the coal burning boiler 4 in the illustrated embodiment, the $CO_2$ and $O_2$ densities 22a and 23a and flow rate 24a of the primary recirculating exhaust gas to be led into the mill 3 are sensed by the $CO_2$ and $O_2$ density monitors 22 and 23 and flowmeter 24, respectively, whereas the coal feed amount 26a fed to the mill 3 is simultaneously sensed by the coal-feed-amount meter 26. At that time, the controller 27 calculates a specific gravity of the primary recirculating exhaust gas on the basis of the $CO_2$ and $O_2$ densities 22a and 23a sensed by the $CO_2$ and $O_2$ density monitors 22 and 23, respectively (see step S1 of FIG. 2); calculates a weight flow rate of the primary recirculating exhaust gas on the basis of the specific gravity of the primary recirculating exhaust gas and the flow rate 24a sensed by the flowmeter 24 (see step S2 of FIG. 2); calculates a pulverized coal amount by weight fed from the mill 3 on the basis of the coal feed amount 26a sensed by the coal-feed-amount meter 26 (see step S3 of FIG. 2); and defines G/C to be a weight ratio of the primary recirculating exhaust gas flow rate [ton/h] to the pulverized coal amount [ton/h] from the mill 3 (see step S4 of FIG. 2).

It is then determined whether the G/C is below 2.0 (see step S5 of FIG. 2). If affirmative, i.e., if the G/C is below 2.0, then the opening degree of the flow regulating damper 25 as flow regulator is increased in response to an opening degree control signal acting as flow control signal issued from the controller 27, thereby increasing the primary recirculating exhaust gas flow rate (see step S6 of FIG. 6).

If negative, i.e., if the G/C is not below 2.0, then it is determined whether the G/C exceeds 6.0 (see step S7 of FIG. 2). If the G/C exceeds 6.0, then the opening degree of the flow regulating damper 25 as flow regulator is reduced in response to the opening degree control signal 25a acting as the flow control signal issued from the controller 27, thereby reducing the primary recirculating exhaust gas flow rate (see step S8 of FIG. 2), as a result of which the G/C falls within a predetermined range (2.0 to 6.0) to achieve a stable oxyfuel combustion operation.

Thus, use of quite the new indicator G/C different from the existing A/C enables the burner 6 to achieve the stable combustion in the oxyfuel combustion environment.

It is to be understood that a method and an apparatus of controlling a flow rate of a primary recirculating exhaust gas in an oxyfuel combustion boiler according to the invention is not limited to the above embodiment and that various changes and modifications may be made without departing from the scope of the invention.

The invention claimed is:

1. An apparatus of controlling a flow rate of a primary recirculating exhaust gas in an oxyfuel combustion boiler wherein while oxygen fed from an oxygen producer is being introduced into a coal burning boiler, a part of an exhaust gas in recirculation is introduced as the primary recirculating exhaust gas into a mill, with the primary recirculating exhaust gas carrying pulverized coal pulverized by the mill to a burner for oxyfuel combustion, the apparatus comprising:

a $CO_2$ density monitor for sensing $CO_2$ density of the primary recirculating exhaust gas to be led to the mill;

an $O_2$ density monitor for sensing $O_2$ density of the primary recirculating exhaust gas to be led to the mill;

a flowmeter for sensing the flow rate of the primary recirculating exhaust gas to be led to the mill;

a flow regulator for regulating the flow rate of the primary recirculating exhaust gas to be led to the mill;

a coal-feed-amount meter for sensing coal feed amount to be fed to the mill; and a controller for calculating specific gravity of the primary recirculating exhaust gas on the basis of the $CO_2$ and $O_2$ densities sensed by the $CO_2$ and $O_2$ density monitors, respectively, calculating weight flow rate of the primary recirculating exhaust gas on the basis of the specific gravity of the primary recirculating exhaust gas and the flow rate sensed by the flowmeter, calculating amount by weight of the pulverized coal fed from the mill on the basis of the coal feed amount sensed by the coal-feed-amount meter, defining G/C to be weight ratio of the flow rate of the primary recirculating exhaust gas to the amount of the pulverized coal from the mill, and outputting a flow control signal to the flow regulator so that the G/C lies within a predetermined range.

2. The apparatus of controlling a flow rate of a primary recirculating exhaust gas in an oxyfuel combustion boiler as claimed in claim 1, wherein the G/C ranges from 2.0 to 6.0.

* * * * *